(12) United States Patent
Braun et al.

(10) Patent No.: US 10,407,966 B2
(45) Date of Patent: Sep. 10, 2019

(54) DRIVE ARRANGEMENT FOR ADJUSTING A COMPONENT IN A MOTOR VEHICLE

(71) Applicant: Robert Bosch GmbH, Stuttgart (DE)

(72) Inventors: Roland Braun, Buehl (DE); Wolfgang Greis, Buehl (DE); Franz Schwendemann, Ottersweier (DE); Hans-Juergen Oberle, Rastatt (DE)

(73) Assignee: Robert Bosch GmbH, Stuttgart (DE)

( * ) Notice: Subject to any disclaimer, the term of this patent is extended or adjusted under 35 U.S.C. 154(b) by 1032 days.

(21) Appl. No.: 14/834,599

(22) Filed: Aug. 25, 2015

(65) Prior Publication Data

US 2016/0059907 A1   Mar. 3, 2016

(30) Foreign Application Priority Data

Sep. 2, 2014   (DE) .................. 10 2014 217 513

(51) Int. Cl.
| | |
|---|---|
| *E05F 15/614* | (2015.01) |
| *B62D 33/027* | (2006.01) |
| *H02K 7/10* | (2006.01) |
| *H02K 15/00* | (2006.01) |

(Continued)

(52) U.S. Cl.
CPC .......... *E05F 15/614* (2015.01); *B62D 33/027* (2013.01); *E05D 5/0207* (2013.01); *E05D 5/062* (2013.01); *H02K 7/10* (2013.01); *H02K 15/00* (2013.01); *E05Y 2900/546* (2013.01)

(58) Field of Classification Search
CPC .. B62D 33/027; B62D 33/0273; B62D 33/03; B62D 33/037; B62D 33/023; E05Y 2900/546; E05F 15/63; E05F 15/614; E05D 5/062; E05D 5/0207; H02K 7/10; H02K 15/00
USPC ............. 310/75 R; 296/27.1, 146.4, 106, 50, 296/146.1, 146.11; 49/334
See application file for complete search history.

(56) References Cited

U.S. PATENT DOCUMENTS

| | | | |
|---|---|---|---|
| 2003/0102692 A1* | 6/2003 | Mooy ..................... | E05D 5/062 296/146.11 |
| 2005/0150078 A1* | 7/2005 | Bittner .................... | E05D 5/062 16/221 |

(Continued)

FOREIGN PATENT DOCUMENTS

| | | |
|---|---|---|
| CN | 101495708 A | 7/2009 |
| CN | 201649923 U | 11/2010 |
| DE | 10222298 | 11/2003 |

(Continued)

*Primary Examiner* — Julio C. Gonzalez
*Assistant Examiner* — Alexander A Singh
(74) *Attorney, Agent, or Firm* — Michael Best & Friedrich LLP

(57) ABSTRACT

A drive arrangement comprising an adjustment drive for adjusting a component, in particular a tailgate, said adjustment drive comprising an output shaft which extends concentrically about an output axis and can be rotated about the output axis in and against a direction of rotation, and comprising a hinge which has a first hinge arm and a second hinge arm that can be rotated with respect to the first hinge arm about a hinge axis, wherein the adjustment drive is provided to rotate the second hinge arm, wherein the hinge axis and the output axis are disposed in alignment with one another and wherein the second hinge arm is connected to the output shaft in a rotationally fixed manner.

12 Claims, 4 Drawing Sheets

(51) Int. Cl.
*E05D 5/02* (2006.01)
*E05D 5/06* (2006.01)

(56) References Cited

U.S. PATENT DOCUMENTS

2006/0082186 A1* 4/2006 Bals ................ E05F 15/614
                                                               296/146.1
2009/0255185 A1* 10/2009 Schachtl .............. E05D 5/062
                                                               49/334

FOREIGN PATENT DOCUMENTS

| DE | 102007059995 | | 4/2009 |
| EP | 1930533 | A1 | 6/2008 |
| KR | 20030078327 | A | 10/2003 |
| WO | 03097979 | A1 | 11/2003 |
| WO | 2007012965 | A1 | 2/2007 |

\* cited by examiner

DRIVE ARRANGEMENT FOR ADJUSTING A COMPONENT IN A MOTOR VEHICLE

BACKGROUND OF THE INVENTION

The present invention relates to a drive arrangement for a motor vehicle, comprising an adjustment drive for adjusting a component, in particular a tailgate, the adjustment drive comprising an output shaft which extends concentrically about an output axis and can be rotated about the output axis in and counter to a direction of rotation, and a hinge, which has a first hinge arm and a second hinge arm that can be rotated with respect to the first hinge arm about a hinge axis. The adjustment drive is provided to rotate the second hinge arm, and the hinge axis and the output axis are arranged in alignment with one another. In addition, the present invention relates to the adjustment drive for the drive arrangement, a motor vehicle comprising the drive arrangement as well as to a method for mounting the drive arrangement.

Drive arrangements are known for adjusting components, for example hatches, in particular for pivoting the tailgate of a motor vehicle. Hatches having a large amount of weight and large dimensions can be adjusted with said drive arrangements.

FIG. 1 shows such a drive arrangement 10 according to the prior art. The drive arrangement 10 comprises an adjustment drive 1 as well as a hinge 4. In the exemplary embodiment depicted, the adjustment drive 1 is a tailgate drive and is provided for pivoting the tailgate (not shown) of a motor vehicle (not shown).

In addition to a drive motor (not shown), the adjustment drive 1 comprises a gear arrangement (not shown) for reducing the rotational speed of the drive motor. The tailgate is secured to the body (not shown) of the motor vehicle with the aid of the hinge 4.

The hinge 4 comprises a first hinge arm 6 which is fixedly mounted to the car body and a second hinge arm 5 to which the tailgate is mounted and which can be rotated with respect to the first hinge arm 6 in and counter to a direction of rotation 81, whereby the tailgate pivots.

A drive lever 3 is disposed on the adjustment drive 1 in order to rotate the second hinge arm 5; said drive lever being disposed on an output shaft (see FIG. 2a) of the adjustment drive, which output shaft extends along an output axis 2. To this end, the output shaft has a driver (not shown), for example comprising a multi-toothed member (not shown), wherein the drive lever 3 has a counter driver (not shown) which works together with the driver in a positive-locking manner. The drive lever 3 can therefore be rotated about the output axis 2.

In order to be able to compensate for system tolerances, provision is made for the drive lever 3 to be axially displaceable for a distance of an adjustment path (not shown) along the output axis 2. The axial adjustment path is, for example, delimited by a retaining element which is also used as a transport securing device.

The second hinge arm 5 is arranged on the drive lever 3 by means of a connecting bolt 33. Said second hinge arm is, for example, fastened to the connecting bolt 33 by means of a screw. In order to compensate for further system tolerances, a cylindrically shaped end (not shown) of the connecting bolt 33 penetrates an elongated hole (not shown) provided in the drive lever 3, said hole extending in a longitudinal direction 35 of the drive lever 3. The connecting bolt 33 can therefore be displaced in the longitudinal direction 35 of the drive lever 3 within the framework of an installation of the drive arrangement 10.

The cylindrically shaped end is mounted here to the drive lever 3 with a wave spring washer 32 and a disc 31; and the bolt 33 is then wobble riveted. Instead of wobble riveting, a retaining ring can, for example, also be used. Due to the resilient attachment, an axial play between the second hinge arm 5 and the drive lever 3 is small and the attachment has a low noise level.

The second hinge arm 5 can additionally be rotatably mounted about the hinge axis 8. In so doing, the hinge axis 8 and the output axis 2 are disposed in alignment with one another.

To this end, the first hinge arm 6 has a fixed shaft 60 which extends concentrically to the hinge axis 8 and is rotationally and axially fixed. A pin end (not shown) of the fixed shaft 60 dips into a central bearing bush (not shown) of the output shaft 2 of the adjustment drive 1. As a result of the pin end of the fixed shaft 60 being inserted into the bearing bushing, an absolutely essential support bearing function for this drive arrangement 10 is achieved.

The rotatable mounting of the second hinge arm 5 about the hinge axis 8 is achieved here by means of two collar bushings (not shown), which are disposed concentrically to the hinge axis 8 and ensure the radial mounting of the second hinge arm 5 on the fixed shaft 60 as well as the axial mounting and support of the second hinge arm 5 with respect to the first hinge arm 6.

A torque which occurs when rotating the second hinge arm 5 relative to the first hinge arm 6 and which is transmitted from the adjustment drive 1 via the drive lever 3 and the connecting bolt 33 to the second hinge arm 5 is supported at the first hinge arm 6 by means of a torque support 11 which is fixedly disposed on the adjustment drive 1. To this end, a support bolt 12, which connects the first hinge arm 6 to the torque support 11, is provided on the torque support 11.

The first hinge arm 6 is, for example, screwed to the car body by means of screws (not shown); or said first hinge arm is welded to the same. By way of example, a through-bore 62 is shown here for the purpose of screwing the first hinge arm 6 to the car body.

SUMMARY OF THE INVENTION

It is the aim of the present invention to provide an alternative drive arrangement for adjusting a component, in particular a tailgate of a motor vehicle. The proposed alternative drive arrangement is to have fewer system related tolerances which have to be compensated for by taking measures. Said drive arrangement is to take up less installation space, to be manufactured more cost effectively and to be mounted faster.

To this end, a drive arrangement for a motor vehicle is provided, comprising an adjustment drive which is provided to adjust a component of the motor vehicle. The component is preferably a hatch. It is particularly preferred for said component to be a tailgate or hatchback of a motor vehicle. In this embodiment, the adjustment drive is therefore a tailgate drive. In principle, the adjustment drive is also, however, suitable for adjusting other components.

In order to automatically pivot the components, it is preferred that the adjustment drive has a drive means which comprises a gear assembly for reducing a rotational speed of the drive means. In order to ensure a sufficient reduction, the gear assembly is preferably designed as duel worm gears, in particular comprising a subsequent spur gear stage and a planetary gear set. Another gear assembly is, however, also preferred, for example worm gearing, spur gearing, a planetary gear set and/or a combination of such assemblies.

The adjustment drive preferably comprises an electric motor, preferably a permanently excited electric motor, as drive means. In a particularly preferred manner, the electric motor is used as a direct current motor (DC motor) or as an electrically commutated electric motor (EC motor).

The adjustment drive has an output shaft which extends concentrically about an output axis. The output shaft can be rotated in and against a direction of rotation about the output axis.

The drive arrangement additionally comprises a hinge. The hinge has a first hinge arm and a second hinge arm that can be rotated with respect to the first hinge arm about a hinge axis. The component can be disposed on the second hinge arm.

The adjustment drive is provided to rotate the second hinge arm. To this end, the hinge axis and the output axis are disposed in alignment with one another. When rotating the second hinge arm, the component disposed thereon is pivoted.

The drive arrangement is characterized by virtue of the fact that the second hinge arm is connected to the output shaft in a rotationally fixed manner.

In this drive arrangement in comparison to the drive arrangement according to the prior art described above, the drive lever used to rotate the second hinge arm is not required. As a result, not only is the drive lever is omitted but also the connecting bolt, the wave spring washer, the disc and the screw. The retaining element for the lever is also omitted. Due to the fewer number of components, the drive arrangement can be produced more cost effectively and can be mounted easier and faster. In addition, fewer system tolerances have to be compensated. The drive arrangement is furthermore of a more compact design.

In order to connect the second hinge arm and the output shaft to one another in a rotationally fixed manner, a driver is disposed on the second hinge arm which is connected in a positive-locking manner to a counter driver of the output shaft. In a particularly preferred manner, said two drivers can be releasably connected to one another. As a result, the drive arrangement of this embodiment is a modular assembly in which the adjustment drive together with the drive means and the gear assembly can be manufactured, mounted and supported independently of the hinge; and/or the drive arrangement together with the adjustment drive and the hinge can be manufactured, mounted and supported independently of the component.

For this reason, the driver and the counter driver preferably have positive-locking means or, respectively, counter means that are designed to correspond to one another. The driver preferably has a gearing and the counter driver a counter gearing. In this embodiment, the gearing of the driver and the counter gearing of the counter driver engage with one another. There is, however, also a preferred embodiment, wherein the driver and the counter driver comprise detent means, which latch with one another, in particular releasably, in the state where said driver and counter driver are arranged adjacently to one another.

In order to arrange the second hinge arm and the first hinge arm adjacently to one another, it is preferred that the first hinge arm has a first and a second retaining arm, which are spaced apart from one another in the axial direction. The two retaining arms are preferably disposed approximately parallel to one another. In so doing, it is preferred that the two retaining arms are connected to one another by means of a connecting arm. In a particularly preferable manner, the first hinge arm is designed approximately U-shaped. Depending on the installation space conditions, another configuration of the first hinge arm is, however, also conceivable.

The first hinge arm is preferably designed in two pieces. There is, however, also a preferred single-parted embodiment of the first hinge arm.

The second hinge arm is preferably disposed between the two retaining arms. For that reason, provision is additionally made in a preferred manner for respectively one collar bushing to be provided in both of the retaining arms, wherein the driver is mounted in the collar bushings. To this end, the driver preferably has a driving pin which passes through both retaining arms, in particular the collar bushings disposed in the retaining arms. The driving pin is preferably disposed approximately transversely to the retaining arms. The collar bushings disposed in the retaining arms provide the radial mounting for the second hinge arm on the driver.

The second hinge arm is furthermore preferably welded to the driver in order to provide a connection that is permanently rotationally fixed and resistant to vibrations. The second hinge arm preferably has a hinge sleeve which is fixedly connected to the driver. Because the hinge sleeve and the driver are fixedly connected to one another, a displacement of the driver in the axial direction is delimited. It is, however, likewise possible for the driver to have a driving head, on which the pin is disposed, wherein the driving head delimits an axial displacement of the driver in an axial direction.

In order to support a torque which occurs when rotating the second hinge arm relative to the first hinge arm, this drive arrangement also preferably has a torque support which is disposed on the adjustment drive. The torque support is preferably a housing component of the adjustment drive. A body component of a motor vehicle can, however, also be used. The torque support is preferably connected to the first hinge arm by means of a support bolt. In a particularly preferred manner, said torque support is designed as a plug-in plate; thus enabling it to be cost effectively manufactured from a plate-shaped flat-strip material, in particular as a stamped part. As a result, said torque support can, for example, be very easily adapted to the geometry of the hinge by means of an additional bending process.

Because the drive lever provided in the drive arrangement according to the prior art and all of the components required for the function thereof are omitted in the drive arrangement according to the invention, considerably fewer system-related tolerances occur and therefore do not have to be compensated. The drive arrangement according to the invention cannot only be more cost effectively manufactured and is easier and faster to install but also has a compacter design.

The aim is likewise met by a hinge for such a drive arrangement. The hinge has the first hinge arm as well as the second hinge arm which can be rotated relative to the first hinge arm about the rotational axis in and against the direction of rotation.

The hinge is characterized in that the second hinge arm has a driver, which extends in the direction of the hinge axis. The driver preferably has a driving head and a driving pin disposed on the driving head. Said driver is provided for the positive-locking connection of the hinge to the output shaft of the adjustment drive. To this end, the driving head has, in particular on the side thereof facing away from the driving pin, positive-locking means, in particular a gearing. A multiplicity of forms is preferred for the gearing which enable a sliding or coupling connection, for example a spline or a serration.

The second hinge arm is preferably, in particular by means of the collar bushings, mounted in retaining arms of the first hinge arm. The retaining arms are preferably spaced apart from one another in the axial direction. It is preferred that the driving pin passes through at least the first retaining arm, in particular the first collar bushing thereof, in the axial direction.

The aim is furthermore met by means of an adjustment drive for such a drive arrangement. The adjustment drive is characterized by the counter driver disposed on the output shaft. The counter driver is provided for the positive-locking connection of the output shaft of the adjustment drive to the hinge. Said counter driver has positive-locking counter means, in particular a counter gearing.

The aim is furthermore met by means of a motor vehicle comprising such a drive arrangement. The drive arrangement is thereby preferably for driving the tailgate of the motor vehicle. Said drive arrangement can, however, also be used for other hatches or components.

The aim is furthermore met by means of a method for mounting such a drive arrangement, comprising the steps:
  sliding the, in particular pre-mounted, adjustment drive in the axial direction onto the hinge, so that the hinge axis and the output axis are disposed in alignment with one another, and the counter driver and the driver are connected to one another in a positive-locking manner, and
  installing the support bolt or the first hinge arm.

After sliding the adjustment drive onto the hinge axis, the mounting of this drive arrangement requires only the installing of the support bolt or the first hinge arm, depending on which components of the drive arrangement are pre-assembled on the adjustment drive. The support bolt is preferably pre-assembled on the torque support. As a result, the positive-locking connection is brought about by the adjustment drive being slid in the axial direction onto the hinge. The mounting can therefore be performed very fast.

BRIEF DESCRIPTION OF THE DRAWINGS

The invention is described below with the aid of the Figures in the drawings. The Figures are presented only by way of example and do not restrict the general concept of the invention.

DETAILED DESCRIPTION

Figure 1:
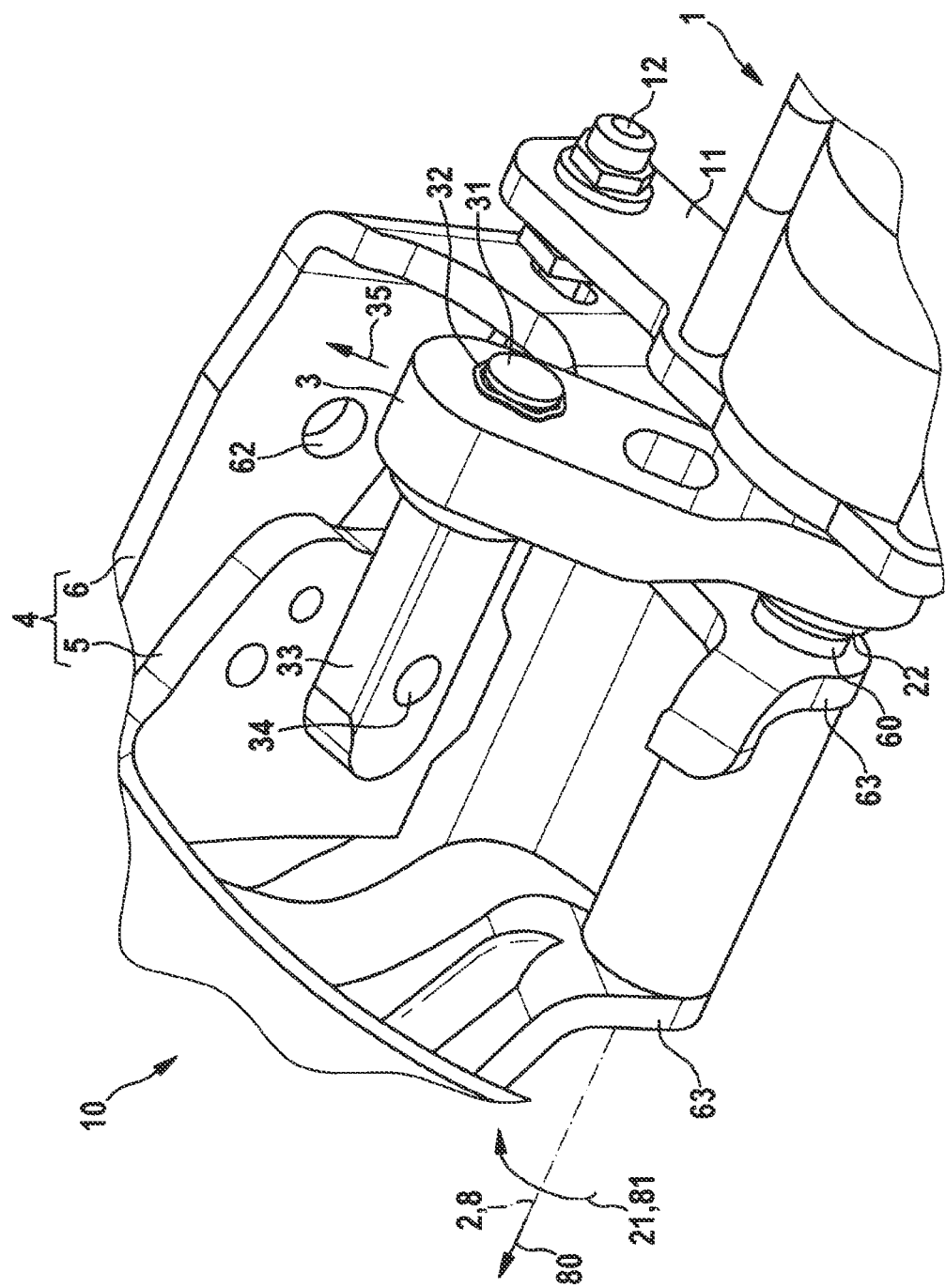
FIG. 1 shows a drive arrangement according to the prior art.

FIG. 1 shows the drive arrangement 10 according to the prior art that was described above.

Figure 2A:
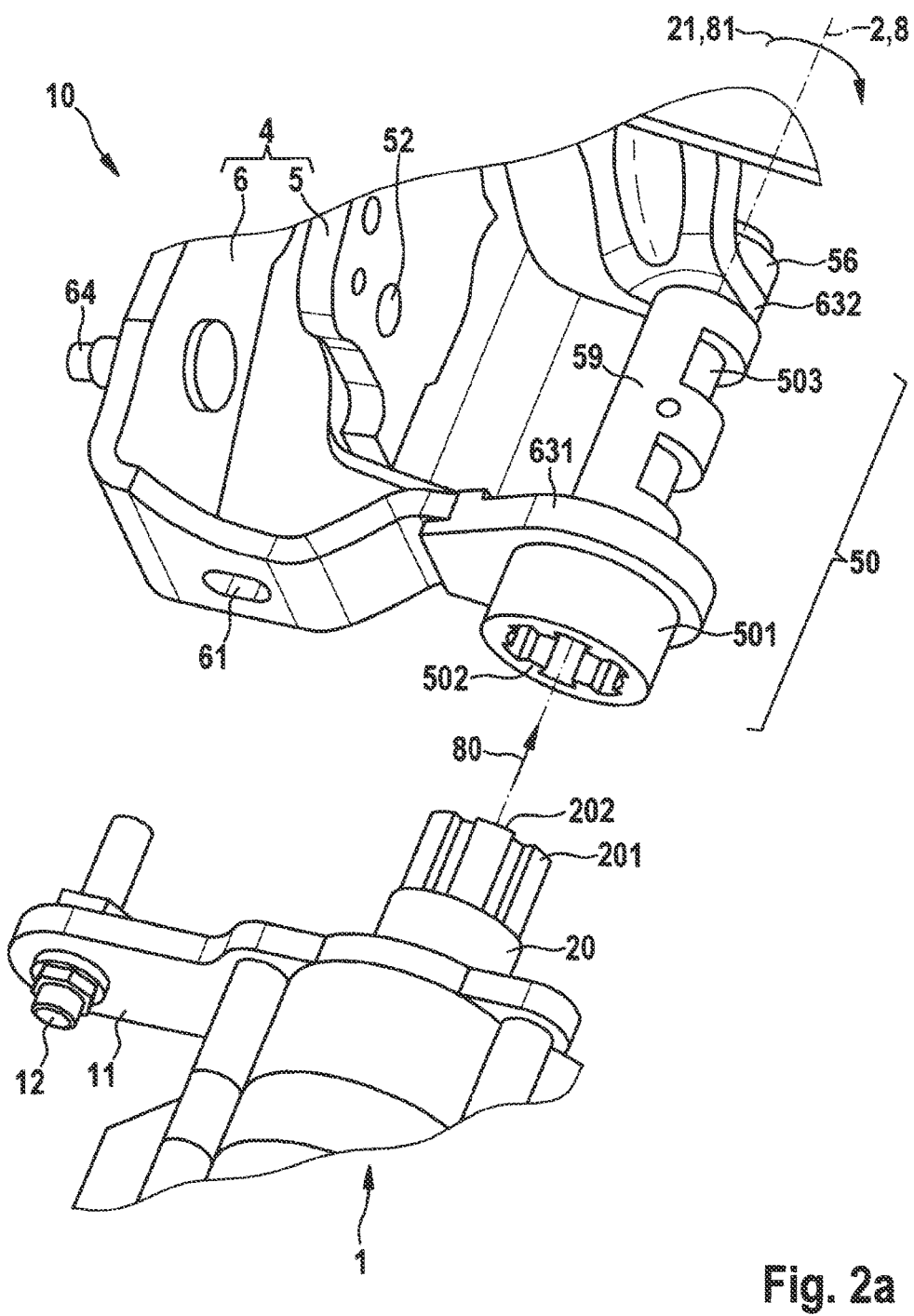
FIG. 2a shows a section from a drive arrangement according to the invention during a mounting procedure.
Figure 2B:
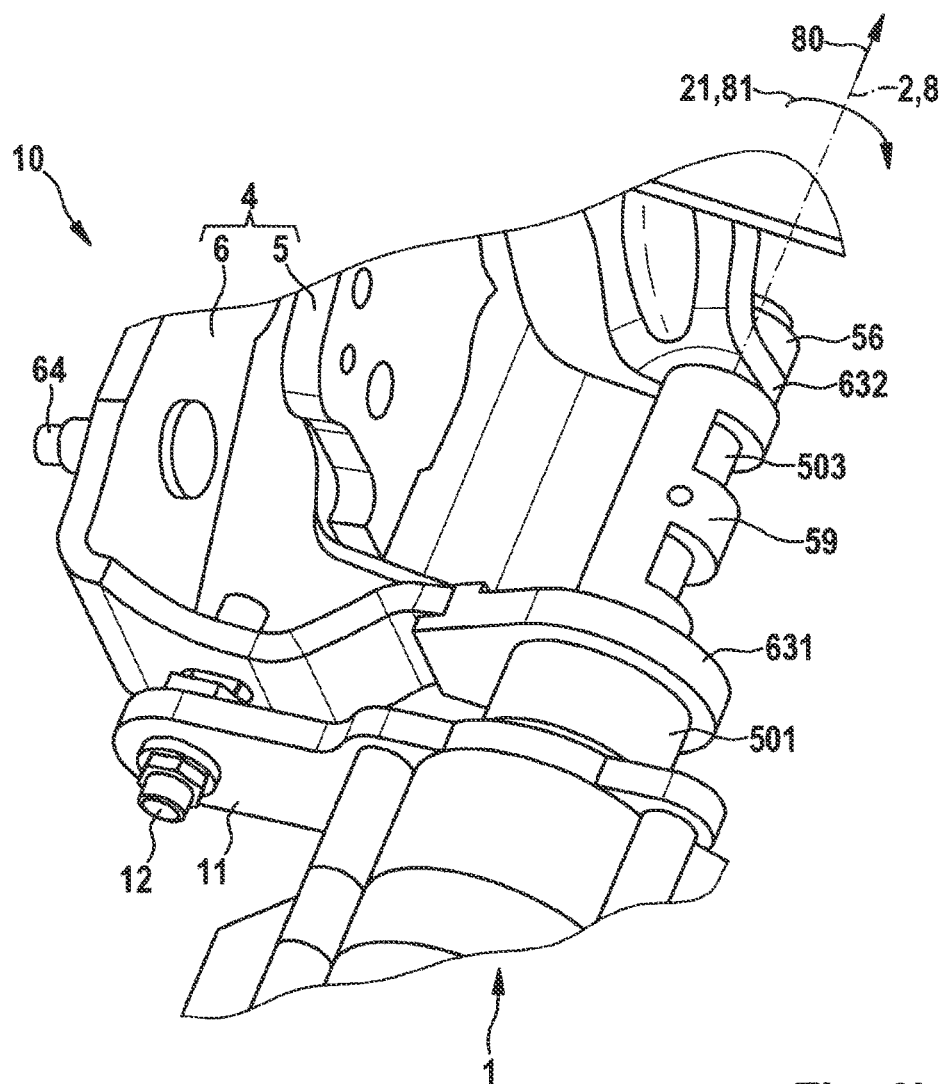
FIG. 2b shows the section from FIG. 2a in a mounted drive arrangement.

FIG. 2a shows a section from a drive arrangement 10 according to the invention, comprising a hinge 4 and an adjustment drive 1 during a mounting procedure. FIG. 2b shows the section from FIG. 2a, wherein the adjustment drive 1 is mounted on the hinge 4.

The adjustment drive 1 is provided to adjust a component (not shown) of a motor vehicle (not shown). The component is preferably a tailgate. In this embodiment, the adjustment drive 1 is a tailgate drive, and the drive arrangement 10 a tailgate drive arrangement. The drive arrangement 10 is, however, also suited to adjusting other components, in particular hatches.

The adjustment drive 1 has an electric motor (not shown) which drives a gear unit (not shown), which is provided to reduce the rotational speed of the electric motor. The gear unit has an output shaft 20 which extends along an output axis 2.

The hinge 4 has a first hinge arm 6 as well as a second hinge arm 5 that can be rotated relative to the first hinge arm 6 about a hinge axis 8 in and against a direction of rotation 81. The first hinge arm 6 is fixedly disposed, in particular, on a body (not shown) of the motor vehicle. The component is disposed on the second hinge arm 5. For this purpose, fastening means 52 are provided on the second hinge arm 5. By way of example, a borehole is shown here as a fastening means 52. The component is then pivoted when the second hinge arm 5 is rotated.

The adjustment drive 1 is provided to drive a hinge 4. It is for that reason that said drive is slid onto the hinge 4 in the axial direction so that the hinge axis 8 and the output axis 2 are disposed in alignment with one another and is then fastened by means of a support bolt 12, in particular to the first hinge arm 6. When disposed adjacent to one another, the adjustment drive 1 and the hinge 4 are connected to each other in a rotationally fixed manner.

The second hinge arm 5 has in turn a driver 50 comprising a driving pin 503 which extends concentrically about the hinge axis 8 and comprising a driving head 501 on which the driving pin 503 is disposed. A positive-locking means 502, in this case an internal gearing, is arranged in the driving head 501.

The output shaft 20 has a counter driver 201 comprising a positive-locking counter means 202 which is designed to correspond to the positive-locking means 502 of the driver 50. The positive-locking counter means 202 is disposed on an open end (not denoted) of the output shaft 20. As a result, the adjustment drive 1 can be slid onto the hinge 4 by being displaced in the axial direction 80.

When the adjustment drive 1 is slid onto the hinge 4, the second hinge arm 5 and the output shaft 20 are connected to one another in a rotationally fixed manner. In addition, the output shaft 2 and the hinge axis 8 are then disposed in alignment with one another. Due to the positive-locking connection, the driver 50 is rotated if the output shaft 20 is rotated. Because the output shaft 20 is only slid onto the driver 50, the adjustment drive 1 and the hinge 4 can again be released from one another by sliding said adjustment drive back against the axial direction 80.

Figure 2C:
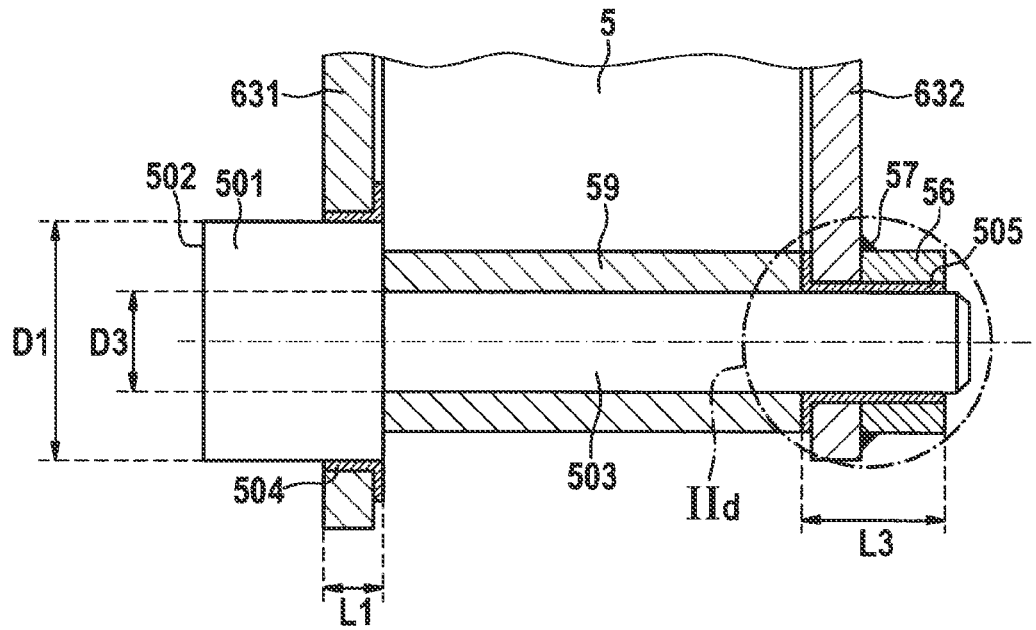
FIG. 2c and FIG. 2d show one cross section through a driver of the drive arrangement that is mounted in retaining arms in different embodiments.
Figure 2D:
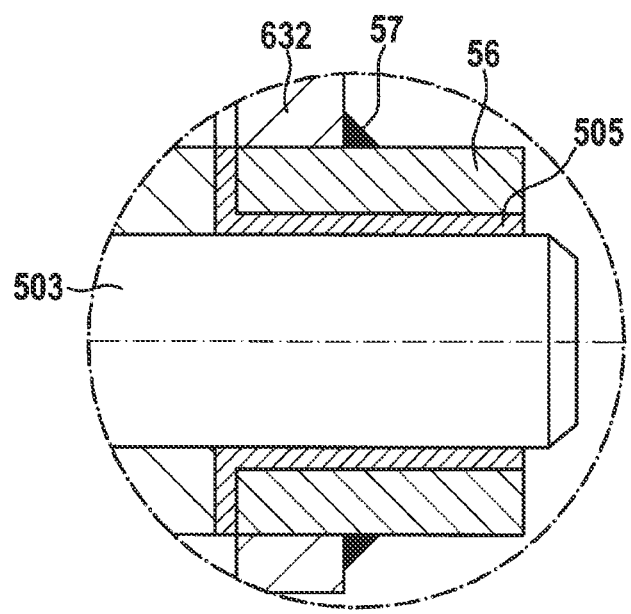

The driver 50 is mounted in two retaining arms 631, 632 of the first hinge arm 6, which are spaced apart from one another in the axial direction 80. In the exemplary embodiment depicted in FIG. 2b, the driver 50 passes through both retaining arms 631, 632. Provision is therefore made for collar bushings 504, 505 in both retaining arms 631, 632. FIG. 2c shows a first embodiment and FIG. 2d shows a second embodiment of the mounting of the driver 50 in the collar bushings 504, 505 of the retaining arms 631, 632.

To this end, the driver 50 has a driving head 501 and a driving pin 503. Said driver extends along the hinge axis 8 and forms the hinge shaft. In the exemplary embodiment shown, said driver passes through both collar bushings 504, 505. In the following description, the collar bushing 504 disposed in the first retaining arm 631 is denoted as the first collar bushing 504, and the collar bushing 505 disposed in the second retaining arm 632 as the second collar bushing 505.

The driving pin 503 is disposed on the driving head 501. The positive-locking means 502 is provided in the driving head 501. Said positive-locking means faces the output shaft 20.

The driving head 501 is mounted in the first collar bushing 504, the driving pin 503 in the second collar bushing 505. Because the driving head 501 has a larger diameter D1 than the diameter D3 of the driving pin 503, the second collar bushing 505 disposed in the second retaining arm 632 has a greater length L3 than the length of L1 of the first collar bushing 504 in the first retaining arm 631. Hence, a surface pressure that occurs as a result of the bearing forces is similar in size in both collar bushings 504, 505.

A bearing sleeve 56 is provided on the second retaining arm 632 in order to support the second collar bushing 505 over the entire length L3 thereof. The bearing sleeve 56 is fixed to the second retaining arm 632. FIG. 2c shows a welded seam as the means of attachment. 57. Another form of attachment of the bearing sleeve 56 to the second retaining arm 632 is, however, also conceivable. FIG. 2d shows, by way of example, the bearing sleeve 56 pressed into the second retaining arm 632. A one piece solution of the second retaining arm 632 and the bearing sleeve 56, in particular a rim hole (not shown) in the second retaining arm 632, is also a preferred embodiment.

A displacement of the driver 50 in and against the axial direction 80 is delimited here as a result of the second hinge arm 5 touching against the collar bushings 504, 505 which are disposed in the first hinge arm 6.

To this end, the second hinge arm 5 has a hinge sleeve 59 which extends in the axial direction 80. The driving pin 50 passes through the hinge sleeve 59. The hinge sleeve 59 is disposed between the retaining arms 631, 632 of the first hinge arm 6. Said hinge sleeve is fixed to the driving pin 503, preferably welded thereto.

In the exemplary embodiment depicted, the first hinge arm 6 is U-shaped. Said first hinge arm comprises the first retaining arm 631 and the second retaining arm 632. Another design of the first hinge arm 6 is, however, conceivable in dependence on the installation space conditions.

In order to support the torque for adjusting the component, a support bolt 12 is provided which is disposed on a torque support 11. In a delivery state of the adjustment drive 1, the support bolt 12 is preinstalled on the torque support in a preferred manner. The torque support 11 is designed in this case as a plate-shaped, plug-in plate and as a housing component of the adjustment drive 1. The German patent publication DE 10 2014 202 765.9 discloses a concept for the permanently backlash-free attachment of the support bolt 12 on the torque support 11, said concept also being applicable to the drive arrangement 10 according to the invention.

The hinge 4 is, for example, mounted by the driver 50 being initially led through the first collar bushing 504 of the first of the two retaining arms 631, then through the hinge sleeve 59 and subsequently through the second collar bushing 505 of the second of the two retaining arms 632; thus enabling said driver to pass through the two collar bushings 504, 505 and the hinge sleeve 59 in the axial direction 80. The hinge sleeve 59 is subsequently fixed to the driving pin 503.

The hinge 4 is mounted in the motor vehicle by the first hinge arm 6 being immovably fixed, for example, to the vehicle body. For that reason, a mounting bolt 64, which is disposed in the first hinge arm 6, is shown here by way of example.

The drive arrangement 10 is mounted by the adjustment drive 1 being slid onto the hinge 4 in the axial direction 80. Said adjustment drive is subsequently fixed to the first hinge arm 6. The support bolt 12 is used for this purpose. It is also conceivable to mount said adjustment drive to the vehicle body.

In the case of this drive arrangement 10, the torque from the output shaft 20 is directly transmitted via the positive-locking connection between the driver 50 and the counter driver 201 to the second hinge arm 5. In so doing, the radial mounting of the second hinge arm 5 as well as the axial mounting and support of the second hinge arm 5 with respect to the first hinge arm 6 takes place via the collar bushings 504, 505 disposed in the retaining arms 631, 632. The adjustment drive 1 is not only positioned but also centered by means of the positive-locking connection between the driver 50 and the counter driver 201.

A drive arrangement 10 is also preferred in which the support bolt 12, the driver 50, the second hinge arm 5 and the first retaining arm 631 of the first hinge arm 6 are pre-assembled on the adjustment drive 1. This embodiment of the drive arrangement 10 is also mounted by the pre-assembled adjustment drive 1 being slid onto the second retaining arm 632 in the axial direction 80, in particular at a defined angle (not shown). The first retaining arm 631 and the second retaining arm 632 are subsequently fixedly connected to one another.

In comparison to the drive arrangement 10 according to the prior art described with regard to FIG. 1, the drive lever 3 and the components connected thereto, which include the connecting bolt 33, wave spring washer 32, disk 31, retaining element 22 and screw 34, are omitted for the drive arrangement 10 according to the invention. System tolerances, which would have to be compensated by the drive lever 3, no longer occur and also do not need to be compensated. Furthermore, the drive arrangement 10 according to the invention does not require a support bearing function as said function is implemented via the pin end of the stationary shaft 60 into the bearing bushing in the drive arrangement 10 of FIG. 1. The drive arrangement 10 according to the invention can therefore be manufactured in a manner that is considerably more cost effective and be mounted quickly and cost effectively. The inventive drive arrangement 10 also takes up less installment space due to the drive lever 3 being omitted.

In order to adjust a tailgate, two of such drive arrangements 10 are generally used in the motor vehicle. This furthermore means a considerable weight reduction due to the multiplicity of omitted components.

The invention claimed is:

1. A drive arrangement (10) for a motor vehicle, comprising an adjustment drive (1) for adjusting a component, said adjustment drive comprising an output shaft (20) which extends concentrically about an output axis (2) and is configured to be rotated about the output axis (2) in and against the direction of rotation (21), and comprising a hinge (4) which has a first hinge arm (6) and a second hinge arm (5) which can be rotated with respect to the first hinge arm (6) about a hinge axis (8), wherein the adjustment drive (1) is configured to rotate the second hinge arm (5) and wherein the hinge axis (8) and the output axis (2) are disposed in alignment with one another, wherein the second hinge arm (5) is connected to the output shaft (20) in a rotationally fixed manner, wherein a torque from the output shaft (20) is directly transmitted to the second hinge arm (5), and further comprising a driver (50) disposed on the second hinge arm (5) and connected in a positive-locking manner to a counter driver (201) of the output shaft (20), a first retaining arm (631) and a second retaining arm (632) spaced apart from one another in an axial direction (80) on the first hinge arm (6), and a collar bushing (504, 505) disposed in each of the first and second retaining arms (631, 632), wherein the driver (50) is mounted in the collar bushings (504, 505) and between the first and second retaining arms (631, 632).

2. The drive arrangement (10) according to claim 1, characterized in that the first hinge arm (6) is disposed between the first and second retaining arms (631, 632).

3. The drive arrangement (10) according to claim 1, characterized in that the driver (50) comprises a driving pin (503), which passes through at least the first retaining arm (631).

4. The drive arrangement (10) according to claim 1, characterized in that the driver (50) comprises a driving head (501), which forms an axial stop.

5. The drive arrangement (10) according to claim 1, characterized in that a torque support (11) is disposed on the adjustment drive (1), said torque support being connected to the hinge arm (6) by a support bolt (12).

6. The drive arrangement (10) according to claim 5, characterized in that the torque support (11) is a plug-in plate.

7. A method for mounting a drive arrangement (10) according to claim 5, wherein a driver (50) is disposed on the second hinge arm (5), said driver being connected in a positive-locking manner to a counter driver (201) of the output shaft (20), the method comprising the steps:

sliding the adjustment drive (1) in an axial direction (80) onto the hinge (4) so that the hinge axis (8) and the output axis (2) are disposed in alignment with one another and the counter driver (201) and the driver (50) are connected to one another in a positive-locking manner, and installing the support bolt (12).

8. A motor vehicle comprising a drive arrangement (10) according to claim 1.

9. A method for mounting a drive arrangement (10) according to claim 1, wherein a driver (50) is disposed on the second hinge arm (5), said driver being connected in a positive-locking manner to a counter driver (201) of the output shaft (20), the method comprising the steps:

sliding the adjustment drive (1) in an axial direction (80) onto the hinge (4) so that the hinge axis (8) and the output axis (2) are disposed in alignment with one another and the counter driver (201) and the driver (50) are connected to one another in a positive-locking manner, and installing the first hinge arm (6).

10. The drive arrangement (10) according to claim 1, characterized in that torque from the output shaft (20) is directly transmitted to the second hinge arm (5) entirely about the hinge axis (8).

11. The drive arrangement (10) according to claim 1, characterized in that the driver 50 extends entirely coaxially with the hinge axis (8).

12. The drive arrangement (10) according to claim 1, characterized in that the driver 50 comprises a driving pin (503) extending entirely coaxially with the hinge axis (8).

* * * * *